United States Patent
Doyle

[15] 3,669,290
[45] June 13, 1972

[54] CONTAINER HANDLING VEHICLE

[72] Inventor: James R. Doyle, Leicester, England
[73] Assignee: Towmotor Corporation, Cleveland, Ohio
[22] Filed: June 26, 1970
[21] Appl. No.: 50,232

[52] U.S. Cl. ........................................ 214/392, 294/81 SF
[51] Int. Cl. .................................................. B60p 1/64
[58] Field of Search .............................. 214/390–396, 75 R, 214/75 G; 212/14; 294/81 SF

[56] References Cited

UNITED STATES PATENTS

| | | | |
|---|---|---|---|
| 2,773,614 | 12/1956 | Edwards et al. | 214/390 |
| 3,348,711 | 10/1967 | Gove | 214/392 |
| 3,305,116 | 2/1967 | McKee | 214/392 |
| 3,369,682 | 2/1968 | Breault | 214/392 |

*Primary Examiner*—Albert J. Makay
*Attorney*—Fryer, Tjensvold, Feix, Phillips & Lempio

[57] ABSTRACT

An operator driven, wheeled vehicle is provided having a U-shaped configuration which is adapted to partially encompass a load container, said vehicle being adapted to grasp and lift the load by means of retractable hooks mounted on telescoping masts on the U-shaped arms, which hooks mate with corresponding openings in container corner brackets whereby said container may be transported, lifted and stacked for storage.

7 Claims, 2 Drawing Figures

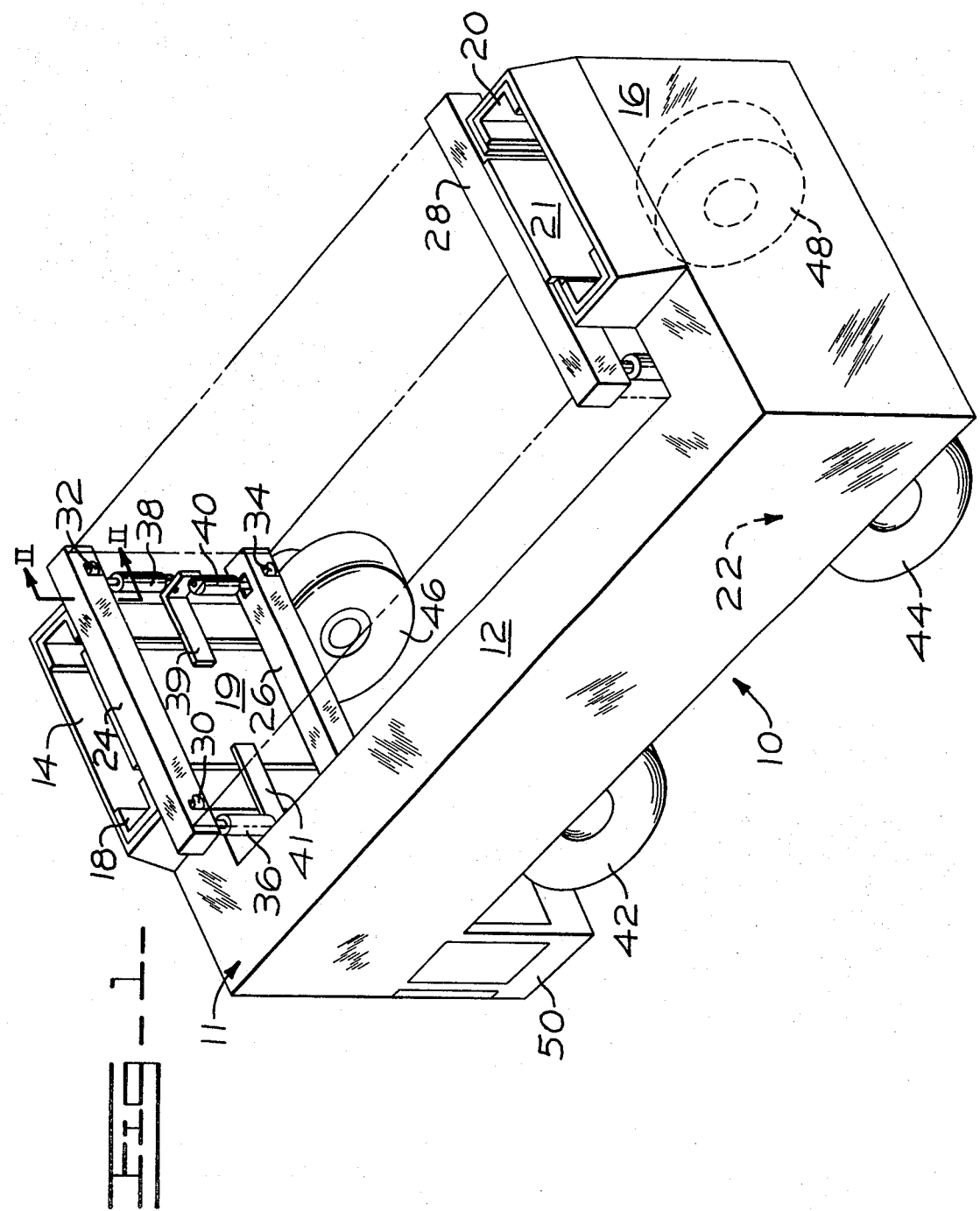

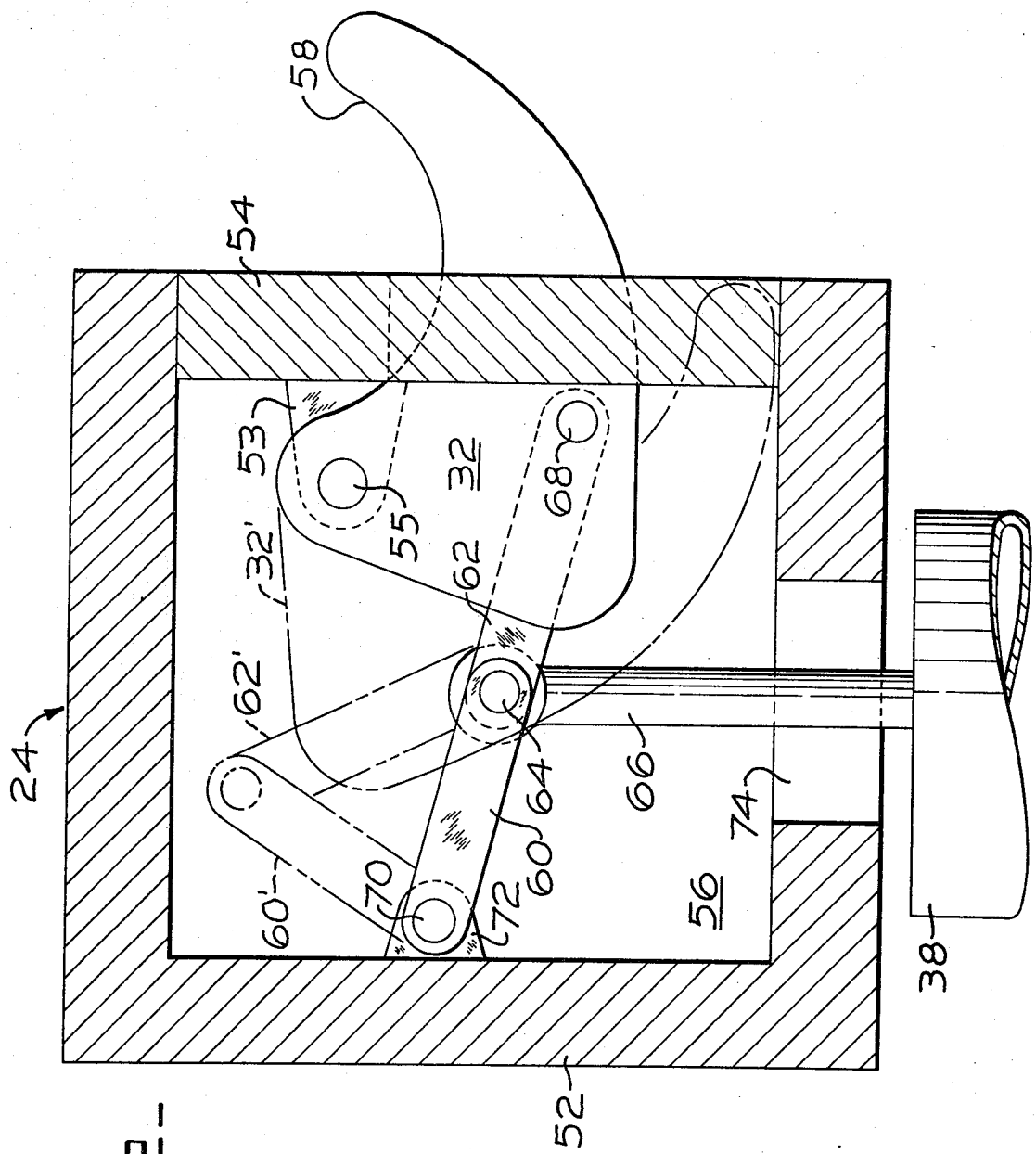

CONTAINER HANDLING VEHICLE

BACKGROUND OF THE INVENTION

In recent years a transportation revolution has occurred under the heading of "Containerization." "Containerization" refers to the packaging of loads of goods to be transported from one point to another in large shipping containers which are loaded at the point of origin and transported to a destination point without the necessity of handling of the goods even though transshipment over several modes of transportation may have to be used. Examples of such transportation modes are trucks, trains, ships, etc. The "multi-modal" concept thus described has proven to be economic both from a standpoint of transportation cost as well as speed since the large containers are loaded and unloaded very quickly between the various transportation modes. An added advantage is the reduction of breakage and pilferage which results from the goods being protected by the locked container at all times during transit and storage.

Yet another advantage is the fact that a containerized load needs no warehouse for transit storage since it is itself a small, portable warehouse. This advantage has given rise to marshalling yards where rows of containers are stored awaiting the arrival of their next mode of transportation. While the open storage thus described is much less expensive than warehouse storage, it has become necessary to stack such containers to more fully utilize the available land space. This has necessitated the use of various machines for lifting, transporting, and stacking the containers.

Existing fork lift trucks have been pressed into service with some success; however, the lift height with such vehicles is limited. In addition, since the usual manner of carrying the container during transit is cross-wise, considerable aisle space is needed. For example, the International Standards Organization [ISO] Class I-C container which is commonly used in the transportation industry has the dimensions of 8 ft. × 8 ft. × 20 ft. Thus, aisles 20 feet wide having an additional 4 feet for manuvering room are needed in the storage yards in order to accommodate the cross-wise presentation of the container, which resulting space is unproductive from a storage standpoint. Straddle carriers have been used, however, these vehicles cannot block stack, and are restricted to circus loading. That is to say, these carriers are unable to enter a string of boxes except by traveling from one end. Overhead and traveling cranes have also been used, however, the great capital expense and lack of mobility of these units makes them far from the ideal solution to the container transportation and lifting problem. The alluded to container problem is thus one of providing a vehicle that has greatly improved lifting and transporting ability over vehicles in current use.

It is to a solution of the problem posed that the invention of this disclosure is directed. The description which follows relates to a vehicle for efficient stacking and carrying operations for transferring cargo containers, particularly ISO Class I-C standard containers between various modes of operation, excluding on-loading and off-loading between ship and dock. The vehicle provided by this invention can be operated by one man and will lift, carry and stack fully loaded containers. It is capable of stacking containers four-high and possibly higher. Thus, at least a doubling of available storage area space is contemplated by use of this device. It is capable of transporting more than one container stacked on top of the other, the exact number limited only by weight and stack stability considerations. In block stacking (going a number of units deep into a stack between adjacent rows) the ISO Class I-C containers side-by-side, only a narrow aisle space, i.e., about 4 feet, is required between the ends of the contiguous rows. This aisle space is required in order that laterally extending arms of the vehicle may advance into the container stack.

The actual transporting of the containers in a storage area requires aisles of approximately 12 to 15 feet in width, which is considerably less than the width required for carrying the 20 foot containers wise. It is also possible to transport the containers through doorways approximately 12 feet wide by 14 feet high. The turning radius is unusually short for this type of vehicle, and intersecting aisle widths are narrower than required for existing machines.

It is therefore the primary object of this invention to provide an operator driven, self-propelled vehicle capable of stacking and transporting cargo containers and to thus facilitate marshalling yard storage of such containers.

It is another object of this invention to provide an operator driven, wheeled vehicle for efficient stacking and carrying operations in transferring cargo containers, particularly ISO Class I-C standard containers.

It is another object of this invention to provide a wheeled vehicle of U-shaped configuration with fully articulated steering such that the vehicle may move into a container stack in a direction normal to the direction of travel of the vehicle and partially encompass a container for removal or storage.

It is another object of this invention to provide a container lift and transport vehicle which is capable of transporting and stacking a plurality of containers at the same time.

It is still another object of this invention to provide a cargo container lift and transport vehicle having telescoping lift masts therein such that containers may be stacked four units high or higher.

It is still another object of this invention to provide a container lift vehicle which has telescoping lift masts and retractable hooks mounted thereon adapted to mate with standard corner mountings on standard cargo containers such that the containers may be lifted and transported by means of said mountings.

BRIEF DESCRIPTION OF THE DRAWINGS

FIG. 1 is a perspective view of the vehicle of this invention in a load carrying position, the load being indicated by phantom lines;

FIG. 2 is a cross-section taken through a hook-supporting bolster and illustrating the mechanism for actuating the hooks.

DETAILED DESCRIPTION OF THE PREFERRED EMBODIMENT

Referring now to FIG. 1, there is generally shown at 10 a vehicle which is an embodiment of the present invention. The vehicle comprises a shaped frame, generally shown at 11, having a longitudinal body portion 12 with front lateral arm 14 and rear lateral arm 16 extending therefrom. The arms and body portion are of sufficient length to partially encompass the cargo container which is shown by phantom lines in the drawing.

Mounted in the front and rear lateral arms 14 and 16, respectively, are front and rear lift masts 18 and 20. These lift masts are of conventional construction comprising a pair of vertical mast members, and are provided with conventional power means (not shown) for raising and lowering. These lift masts may alternatively be of conventional, telescoping construction capable of an extended length such that cargo containers may be stacked up to four units high or higher. The length of the lift masts may be such as to telescope down approximately to vehicle height. Lift masts 18 and 20 are of essentially identical construction.

As an alternative to having independent power means, the lift masts may be powered by the general motive power means of the vehicle (not shown), the location of which is shown generally at 22. Each lift mast supports a carriage having an upper and lower bolster or spreader bar mounted thereon for a purpose to be hereinafter described. For example, front lift mast 18 has upper and lower bolsters 24 and 26, respectively, mounted cross-wise on carriage 19. Similarly, rear lift mast 20 has a pair of bolsters mounted on carriage 21 one of which is shown at 28. Each carriage is conventionally movably mounted to its respective lift mast by carriage rollers (not shown). Each pair of upper and lower bolsters is raised or lowered by its respective lift mast fixedly mounted on its respective carriage in spaced, parallel relation (approximately 8 feet apart).

Each spreader bar or bolster contains a pair of retractable pins (not shown) or hooks, e.g. 30 and 32 on bolster 24. The purpose of the hooks on upper bolsters 24 and 28 is to engage the end facing holes of the standard container top corner castings (not shown) in order to apply a lifting force to the container. Similar lover hooks, one of which is shown at 34, engage the end facing holes of the bottom corner castings in order to form a longitudinal tie between the masts, thus bracing the U-shaped frame for the roading phase of its work. While a container may be lifted and stacked by engaging only the upper or lower bolster on each lift mast, it is preferable from a structural rigidity standpoint to connect all bolsters to the container.

Mounted adjacent each bolster end, as for example at 36, 38 and 40, are jacks, the purpose of which is to extend and retract the previously mentioned hooks. Each jack has its end opposite the rod end fixed to a bracket which is, in turn, fixed to a carriage. For example, jacks 38, 40 are shown fixed to L-shaped bracket 39 which is fixed to carriage 19. Similarly, a corresponding L-shaped bracket 41 is shown fixed to carriage 19 and adapted for mounting jack 36. While an actuation jack is provided for each hook, an alternative actuation means may be provided whereby a single, double-acting jack or a jack and a long bar linkage simultaneously actuates hooks on the ends of both the upper and lower bolsters. These jacks may be conventionally powered by their own power supplies (not shown) or by the motive power means 22.

Pivotally mounted under body portion 12 are front and rear drive wheels 42 and 44, respectively. The construction of these drive wheels is as shown to be conventional in U.S. Pat. No. 3,348,711. These drive wheels are linked to the motive power means 22, thus providing vehicle 10 with the facility of self-propulsion.

Pivotally mounted on front and rear lateral arms 14 and 16 are front and rear idler wheels 46 and 48, respectively. The idler wheels are mounted on free casters with castering selective and/or lockable to prevent castering into the container or adjacent cargo containers when reversing out of a block stack. The four wheels are positioned as shown or in any other suitable arrangement, including the conventional one of a wheel at each corner of the vehicle.

Alternatively, the drive wheels may be placed diagonally opposite each other with the idler wheels similarly diagonally placed, e.g. drive wheels 42, 48 and idler wheels 44, 46.

Operator's cab 50 is mounted as shown under the front portion of body 12 which results in front drive wheel 42 being longitudinally set back from the front of the vehicle. Of course, the operator's cab would occupy a different position with a different wheel placement. For example, the cab could be mounted between the lefthand wheels 42, 44 if the aforementioned conventional wheel placement were used.

It is contemplated that all wheels may, in the alternative, be steered positively. In other words, wheels 46 and 48 would not be freely castered. The mechanism for positively steering wheels 46 and 48 may be similar to that which is shown to be conventional in U.S. Pat. No. 2,863,518. Thus, four-wheel steering would be provided.

The operator's cab contains control means (not shown) for operating the vehicle's motive power means, lift masts, hooks, and steering. These power means and control means are conveniently housed in body 12, arm 14, and arm 16. It is contemplated that each of the wheels 42, 44, 46 and 48 be capable of at least pivoting 90° about a vertical axis from the position shown in FIG. 1. It is further contemplated that the masts 18 and 20 are capable of being operated independently to allow for any misalignment between the end facing holes and the mast hooks due to unequal tire deflection, uneven ground or distored cargo containers.

Referring now to FIG. 2, which is a vertical sectional view taken through bolster 24, there is shown in detail the mounting of a typical hook 32. The bolster 24 comprises a C-channel 52 having an end plate 56 and a side plate 54 fixed thereto. Of course, a corresponding end plate would be fixed to the opposite end of the bolster or, in the alternative, end plates need not be provided, thus facilitating inspection and repair of the mechanism.

Hook 32 is a plate member having a curved, tapering point 58 which is adapted to engage container corner fittings. The hook is pivotally mounted on a pivot pin 55 of a first pivot mount 53 which is fixed to side plate 54 within the bolster. The hook may be completely retracted into the bolster from the extended position to the phantom position of 32' by means of a pair of links 60, 62 which are pivotally attached to a pivot pin 64 on the end of a hydraulic jack 38 actuation rod which is shown at 66. First link 62 is pivotally mounted to the hook by means of pivot pin 68. Second link 60 is pivotally mounted by pivot pin 70 to a second pivot mount 72 which is fixed to the interior bolster wall as shown. An opening 74 in the bottom of the bolster is provided to allow free travel of rod 66.

With the hook in fully extended position links 60, 62 are in a substantially straight line which effectively locks the hook in its extended position. This locking feature is especially advantageous since each hook supports a fraction of the container weight. That is to say, each hook supports a weight approximately equal to the container weight divided by the number of hooks. Upon actuation of the jack of rod 66, the links are jackknifed to the phantom position shown by 60', 62' and the hook is fully retracted into the bolster as shown by 32'.

Each hook projects through a slot in side plate 54, however, a projection around the ends of a solid plate could be alternatively used.

It is to be noted that the lower bolster jacks being mounted on top of the bolster requires that a rod opening be provided in the top rather than in the bottom of the bolster. Also necessitated by this jack placement is a reversal of rod actuation direction from that of the upper bolster to accomplish a given extension or retraction function. The placement of the jacks between the upper and lower bolsters, while not necessary, results in an advantageously compact design.

The operation of the vehicle is as follows. The operator drives the vehicle, either end first, down an aisle formed by stacked containers. The aisle need be only slightly wider than the width of the vehicle. The operator stops the vehicle longitudinally adjacent a stack of containers. Drive wheels 42 and 44 are rotated 90° to the direction of travel. If wheels 46 and 48 are also positively steerable, they are simultaneously rotated. The operator then drives the vehicle laterally into the stack, fitting arms 14 and 16 into the approximately four foot wide spaces left between the ends of contiguously stacked containers.

When the vehicle arms are positioned within the container stack, the operator raises or lowers lift masts 18 and 20 and thereby carriages 19 and 21 having bolsters mounted thereon such that the now retracted hooks line up with the desired container in the stack. The jacks are actuated and the hooks extend into the end facing holes of the container corner castings. Either one or several containers at a time may be lifted in this manner, depending upon vehicle and stack stability considerations. The lift masts are raised slightly to lift the desired container or containers off the stack. The driver then reverses direction and drives the vehicle with load out of the container stack, and back into the aisle. The masts are then lowered such that the plane of the lowest container bottom is approximately flush with that of the U-shaped vehicle frame 11. In this manner, the operator has a good view of the roadway at all times when traveling. The driver then rotates the wheels 90° by using the steering means such that the vehicle is again in the forward traveling mode. The vehicle may then be driven to a new location. At the new location, the above process may be reversed and the container or containers may be stacked on another container stack.

It is understood that the foregoing description is merely illustrative of a preferred embodiment of the invention and that

I claim:

1. A vehicle comprising a generally U-shaped frame formed by a longitudinally extending body and laterally extending arms mounted adjacent each end of the body, lift mast means mounted on each arm, and means mounted on each lift mast means for holding cargo containers, said lift mast means comprising a lift mast having carriage means mounted thereon and power and control means for raising and lowering said lift mast, said means for holding a cargo container comprising bolster means mounted on each of said carriage means and hook means mounted on said bolster means, said hook means engaging end facing holes of standard container corner castings for lifting said containers, said bolster means comprising at least one bolster in the form of a member mounted on said carriage means and the hook means comprise a pair of retractable hooks movably mounted on each bolster, and power means to extend and retract said hooks and control means to actuate said power means whereby said hook means may alternatively engage or disengage a cargo container, said power means to extend and retract said hooks comprising a jack for each hook, said jack having an actuation rod pivotally connected to said hook by linkage means, which linkage means is capable of locking said hook in the extended position, said linkage means comprise a first and a second link, said first link having one end pivotally connected to said rod, said second link having an end pivotally connected to said hook and an opposite end pivotally connected to said rod.

2. The invention of claim 1 wherein the number of bolsters is two and each bolster comprises a transversely extending member in spaced, parallel relation to the other bolster and having one of said hooks mounted on said member adjacent each end.

3. The invention of claim 1 wherein the lift masts are telescoping masts capable of being extended and retracted and are of a length which is no greater than the vehicle height when retracted and when fully extended are of a length such that containers may be stacked, one on top of the other.

4. A vehicle comprising a generally U-shaped frame formed by a longitudinally extending body and laterally extending arms mounted adjacent each end of the body so as to define an open top and an open side of the vehicle, vertically movable carriages mounted on vertically telescoping lift masts which are mounted on the interiors of each arm in spaced, parallel relation, one to another said telescoping lift masts being of a length in their fully retracted condition which is approximately no greater than the vehicle height and being of a fully extended length so as to be able to stack standard cargo containers at least two high, said telescoping lift masts being mounted so as to be extendible through the open top of the vehicle, bolsters in the form of generally horizontally extending members mounted on the carriages and movable therewith, hook means adapted for holding a cargo container mounted on the bolsters, power and control means for actuating the lift masts, a plurality of wheels supporting said frame means for fully pivoting each wheel about a vertical axis therethrough, power means also mounted on said frame and connected with at least two wheels for propelling said vehicle whereby said vehicle may be driven longitudinally to a point where the open side of the vehicle is laterally adjacent a cargo container load and, upon pivoting the wheels at a right angle to the direction of travel, and may be driven in a transverse direction until the vehicle encompasses the cargo container load whereupon the hook means may be actuated to hold the cargo container load and the power and control means may be actuated to raise the carriages and thereby the cargo container load for subsequent transfer to another location.

5. The invention of claim 4 wherein the hook means are a pair of hooks mounted on each bolster and power means to extend and retract said hooks and control means to actuate said power means.

6. The invention of claim 5 wherein the power means to extend and retract said hooks comprise jacks having actuation rods, said rods being pivotally connected to said hooks by linkage means.

7. The invention of claim 4 wherein the number of wheels is four, two of the wheels are mounted under the body one longitudinally behind the other, and each of the other two wheels is mounted adjacent one of the laterally extending arms.

* * * * *